July 11, 1944. T. ZUSCHLAG 2,353,211
ELECTRICAL ANALYSIS
Filed May 13, 1940 2 Sheets-Sheet 2
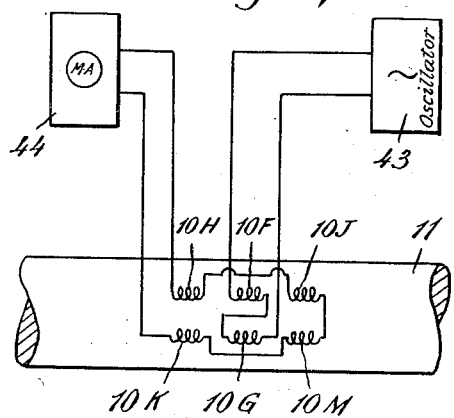
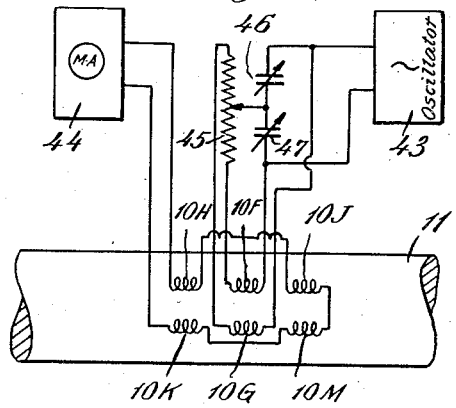
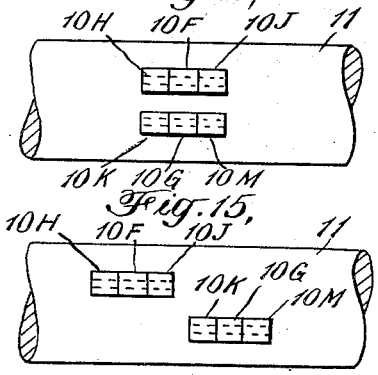
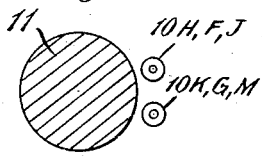
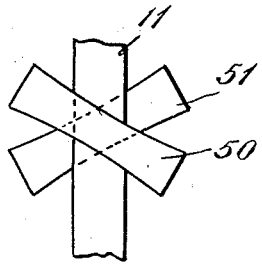
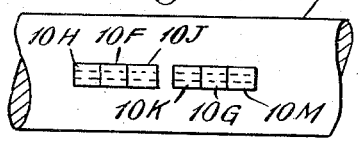
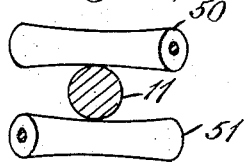
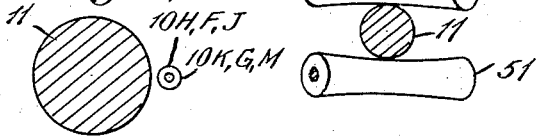
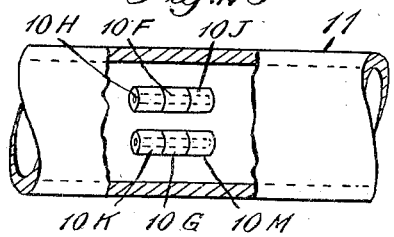
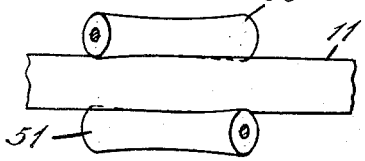
INVENTOR
Theodor Zuschlag
BY
ATTORNEYS Patented July 11, 1944

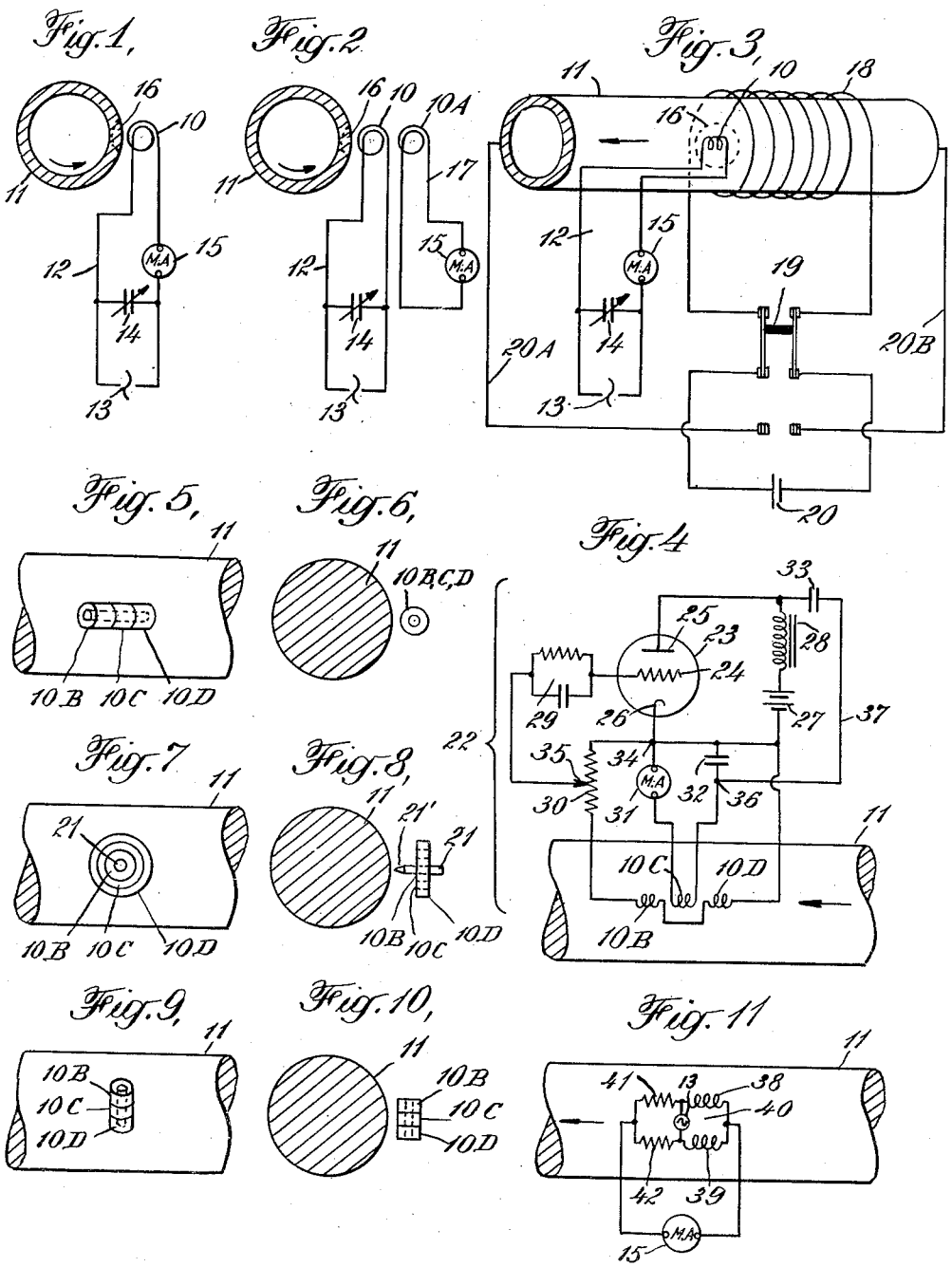

2,353,211

UNITED STATES PATENT OFFICE 2,353,211

ELECTRICAL ANALYSIS

Theodor Zuschlag, West Englewood, N. J., assignor to Magnetic Analysis Corporation, Long Island City, N. Y., a corporation of New York Application May 13, 1940, Serial No. 334,790

3 Claims. (Cl. 175—183)

This invention relates to electrical analysis and more particularly to the non-destructive testing of elongated metallic bodies. The invention is particularly adapted to the detection of flaws and other structural defects in elongated metallic bodies of substantially uniform cross section and elongated metallic bodies of rotation, i. e., bodies having a circular but not necessarily uniform cross section that may be described by rotating a plane shape. Such bodies include rods, tubes and vessels of circular cross section.

It has been proposed heretofore to determine the physical and metallurgical characteristics of metallic bodies by methods of electrical analysis. A common feature of such methods resides in the fact that the material to be investigated is exposed to the action of electromagnetic fields in such a manner that circumferential currents are created throughout certain cross sections of the object being investigated. In other words, the entire periphery of a cross section of the object is energized by the currents passing therein. In such methods the actual investigation normally is carried out by means of one or more search coils so disposed that they are coupled inductively either completely or partially with the material being investigated.

From a mechanical point of view, heretofore customary methods of electrical analysis have been desirable when material of relatively small cross section such as small diameter rods is being investigated. In such case, the rods are disposed within an energizing coil and so are energized around their entire periphery. However, these methods are not sufficiently sensitive and selective, especially when investigating material of relatively large cross section. Thus, with such methods and operating with material of relatively large cross section serious flaws, cracks, blow-holes, etc. may escape detection.

As a result of my investigations, I have developed improvements in methods of and apparatus for electrical analysis whereby the above-described difficulties are in large part avoided and which assure detection of flaws and the like in elongated bodies of uniform cross section and in rotational bodies in cases in which such defects would go undetected by methods available heretofore. Thus, I have discovered that flaws and the like in elongated metallic bodies of substantially uniform cross section and the bodies of rotation may be detected almost infallibly by inducing eddy currents in only a portion of a cross section of the body by passing a primary alternating current through a coil that is disposed close to the body but separated from the body by an air gap, moving the coil relative to the body along the surface thereof, thereby inducing eddy currents in a series of such relatively small portions of the cross section of the body and observing variations in the primary current brought about by changes in the eddy currents for the different relationships of coil and body that occur when the two are moved in relation to each other. In accordance with my invention, the energizing coil preferably is relatively small as compared to the cross section of the body being investigated and in any case is such that circumferential energization of the body is avoided. Moreover, the coil is not disposed coaxially with the body but, on the contrary, is disposed away from the axis of the body, i. e., uncoaxially. Thus, when investigating a tube, the coil is placed close to the tube wall either inside or outside but not in coaxial alignment therewith. When investigating a body of solid cross section, investigation is made with the coil disposed adjacent the surface of the body and relatively close thereto so as to be coupled inductively therewith.

In short, my invention contemplates (in electrical analysis of an elongated metallic body) the improvement which comprises disposing said body in inductive relationship but other than coaxially, i. e., uncoaxially, with a coil energized by alternating current, said coil being of the non-closed core type and of which the effective area is small in relation to the cross-sectional area of the body being analyzed, and with the axis of the body parallel to the axis of the coil, thereby creating eddy currents in only a portion of the periphery of a cross section of the body, moving the coil to another position with respect to the body but at substantially the same short distance therefrom and indicating and observing variations in the alternating current brought about by a difference in eddy currents in the contiguous small portions of cross-section of the body which are successively brought into inductive relationship with the coil. Apparatus of my invention involves the combination which comprises, in combination with an elongated metallic body to be tested, a coil of the non-closed core type disposable in inductive relationship with said body at a small uniform distance therefrom, the effective area of said coil being small in relation to the cross-sectional area of said body to be analyzed, said coil being positioned so that its axis is parallel to the axis of said body and other than coaxial therewith, means for energizing said coil with alternating current to create eddy currents in only a small portion of the cross-sectional area of said body, means for moving said body with respect to said coil so that contiguous small portions of cross-section of said body are successively brought into inductive relationship with said coil, and means for indicating variations in the alternating current in said coil caused by changes in said eddy currents.

In accordance with my invention, the size of the area energized by the alternating current should be as small as possible in comparison with the area of the cross section. In this way, the ratio of the area of defect sought to the area of the energized space is as great as possible, and I have found that, generally speaking, the defect or flaw sought should represent a reasonable proportion of the total area energized by the eddy currents if the defect is to be successfully detected. For example, in the case of large bodies the area in which eddy currents are created should not be more than one thousand times the area occupied by the defect sought to be detected and as the size of this area is increased the opportunity for detecting a small defect is correspondingly decreased. It will be understood that the term "area" as employed above and elsewhere in the present specification, and in the appended claims, is used in its broad sense to mean a three-dimensional area such as an enclosed space or volume, for example.

I have found that when only a small portion of the cross section of a metallic object being investigated is energized with eddy currents by means of a coil connected in a primary circuit, the detection of the defect is best observed by noting the variation of the current in the primary circuit brought about by changes in the eddy currents. The observation of change of this primary current may be made by means of an indicator connected in the primary circuit. This is preferred practice. However, change of the primary current may be observed by placing a small pickup coil in close inductive association with the primary circuit, the indicating instrument being connected in a secondary circuit with this pickup coil.

Preferably, the energizing coil is disposed in a tunable circuit energized by the alternating current and the circuit is tuned by means of a condenser or the like in the circuit prior to observing the effect of the eddy currents upon the primary current.

My invention may be practiced with alternating current of various frequencies but the sensitiveness of the method tends to increase as the frequency of the current is raised. Thus, other factors being equal, the frequency should be high, say in excess of 500 cycles per second, and preferably higher, say 10,000 to 100,000 cycles per second. However, as the frequency of the energizing current is increased the depth to which the eddy currents penetrate in the body being investigated decreases. This effect of high frequency may be overcome in the case of magnetizable metallic bodies by subjecting the body to flash magnetization in a strong direct current field immediately before bringing the body into relationship with the energizing coil (see discussion of Fig. 3). The effect of high frequency upon penetration of the eddy currents may also be offset by carrying on the investigation with the coil energized with high frequency current while the body of magnetizable metal is disposed in a strong D. C. field. The effect of the excitation or magnetization with the direct current field is to lower the permeability of the metal, thereby increasing the penetration of high frequency eddy currents.

I have also discovered that in the practice of my invention, employing high frequency and inducing eddy currents in only a portion of the cross section of the body being investigated, flaws and other important structural defects in the body affect electrical characteristics of the body, such as resistivity, so that the presence of flaws, etc. is emphasized by marked changes in eddy currents. At the same time, less important defects such as strains and variations in dimension appear to have their greatest effect upon magnetic characteristics, such as permeability. These magnetic characteristics exert only a minor influence upon the eddy currents. Consequently, my invention permits detection of flaws, etc., without confusing the operator by large but relatively insignificant changes in current due to strains, etc. in the body.

A further advantage of the practice of my invention resides in the fact that it requires but very little power as compared with methods available heretofore.

In carrying out the process of my invention, I prefer to rotate the body on its axis so that the coil comes into inductive relationship with and energizes successive small portions around the cross section of the body. The effect of the resulting eddy currents in the several portions upon the primary current is observed as the body is rotated. With elongated bodies of uniform cross section, such as rods or tubes, investigations preferably are conducted by rotating the body while moving it endwise along its axis so that the coil in effect pursues a spiral path (helix) around the body.

Several forms of apparatus may be employed in investigation of metallic bodies in accordance with my invention, bearing in mind the principles enunciated hereinbefore. These and other features of my invention will be more thoroughly understood in the light of the following detailed description taken in conjunction with the accompanying drawings in which:

Fig. 1 illustrates diagrammatically a simple form of apparatus for practicing my invention, provided with current indicating means in a tunable primary circuit;

Fig. 2 is a diagram of a modification of the apparatus of Fig. 1 provided with a pickup coil and a current indicating means in a secondary circuit closely coupled to the primary circuit containing the energizing coil and adapted to show variations in current in the primary circuit brought about by variations in eddy currents induced in different parts of the body being investigated;

Fig. 3 is a wiring diagram of a further modification of the apparatus of Fig. 1;

Fig. 4 is a wiring diagram of a modification of the apparatus of my invention employing a vacuum tube oscillator circuit with a variable feed-back for energizing and detection purposes;

Figs. 5-6, 7-8 and 9-10 illustrate various arrangements of a coil combination 10B, 10C, 10D for use in the apparatus of Fig. 4;

Fig. 11 is a schematic diagram of a bridge circuit for the practice of my invention;

Fig. 12 is a wiring diagram of a further modification of the apparatus of my invention employing an oscillator circuit of constant amplitude for energizing a pair of bucked energizing coils;

Figs. 13-14, 15-16 and 17-18 illustrate suitably disposed coil groups in the apparatus of Figs. 12 and 19;

Fig. 19 illustrates a modification of the apparatus of Fig. 12 with the energizing coils connected in bridge relationship;

Figs. 20-21 show a preferred means of disposing the test coils of Figs. 13-14 within a tube to be tested; and Figs. 22, 23 and 24 illustrate a roller combination adapted to impart a desired helical motion to a tube or the like being tested.

Referring now to Fig. 1, a simple but effective apparatus for the practice of my invention comprises a small excitation or energizing coil 10 disposed adjacent and parallel to a metallic body 11 to be investigated, say a brass tube of circular cross section. The coil, of non-closed core type, has an effective diameter smaller than that of the tube. The coil is connected in a circuit 12 in series with a suitable source of alternating current 13, preferably adjustable to a relatively high frequency, and a variable condenser 14 is connected across the circuit for tuning purposes. A suitable current indicating means 15, say a milliammeter, is connected in the circuit in series with the coil and the power source.

In testing operations conducted with the device of Fig. 1, the body under test, say a tube, is moved (preferably "spiraled") past the coil with the circuit energized and tuned. Eddy currents are induced in a small portion 16 in the body. These eddy currents change with the character of the metal in which they are induced, bring about changes in the primary current flowing through the coil, and thus are manifested by the indicator. As long as the metal passing the coil is uniform no current change will be observed, but the presence of a flaw or crack in the metal will be manifested by a sharp change in a current characteristic. Generally speaking, the higher the frequency and the greater the ratio of size of defect to cross section energized the more pronounced will be the current change brought about by the presence of a flaw.

The current indicating means preferably is connected directly in the energizing circuit, especially in the simpler forms of test apparatus, but in certain instances it may be desirable to connect the indicator in a secondary circuit energized by a pickup coil coupled inductively with the primary circuit. A modification of the apparatus of Fig. 1 embodying such an arrangement is illustrated in Fig. 2, like parts being indicated by the same numbers as in Fig. 1. In the apparatus of Fig. 2, however, a small pickup coil 10A is inductively associated with the primary circuit and connected to the indicator 15 in a separate circuit 17. The operation of the apparatus of Fig. 2 is the same as that of Fig. 1, the only difference being that current changes in the primary circuit are indicated indirectly.

As stated above, sensitivity in detection of flaws and the like increases in general with the frequency of the energizing current. However, at high frequency the field occupied by the eddy currents in the metal undergoing test tends to become shallower, so that with high frequency excitation a deep-seated defect may escape detection unless steps are taken to increase penetration of the eddy currents. In the case of non-magnetizable metals this is perhaps best accomplished by decreasing the frequency of the exciting current and to this end the apparatus should be provided with means for varying frequency over a wide range. But in the case of magnetizable metal, such as steel or iron, increased penetration of the eddy currents is advantageously obtained by means of auxiliary direct current excitation to magnetize the material. This may be done by "flash" magnetization in which the object to be tested is subjected to the action of a strong D. C. current or field immediately prior to testing in the A. C. apparatus, so that residual magnetization tends to decrease the permeability of the metal and thus increase penetration of the high frequency eddy currents and also tends to magnetize the defect sought and form it into a permanent magnet having well defined poles. Instead of flash magnetization, the object undergoing test, in the apparatus of say Fig. 1, may be subjected to the action of a strong D. C. field at the same time that it is undergoing test with the A. C. apparatus.

Both of the foregoing methods are illustrated in Fig. 3 wherein the apparatus of Fig. 1, as applied to a cylindrical bar 11, is supplemented with means for passing a direct current directly through the bar 11 and with means for subjecting the bar to a strong D. C. field at the same time that it is in inductive relationship with the small A. C. coil. Thus, as shown in Fig. 3, a cylindrical bar 11 is disposed in inductive relationship with the small test coil 10, the test coil being connected to the A. C. current source 13 through the milliammeter 15, with the variable condenser 14 connected across the circuit 12. In addition, a coil 18 is disposed around the bar and this is adapted to be energized by a D. C. power source 20 through a switch 19, when this switch is thrown to its upper position. The bar may also be energized directly from the D. C. power source by means of leads 20A, 20B that are connected in good electrical contact with the ends of the bar and are also connected to the switch 19 when the latter is thrown to its lower position.

Particularly good results in the testing of elongated bodies of uniform cross section and of bodies of rotation are obtained with the apparatus of Fig. 4, which employs an oscillator tube circuit adapted for variable feed-back, as described and claimed in my copending application Serial No. 301,179, filed October 25, 1939, now U. S. Patent No. 2,267,884. In this apparatus the metal body 11, say a brass bar, is tested by means of a coil assembly comprising coils 10B, 10C, 10D which are disposed adjacent each other and preferably in coaxial relationship. As in all cases involving the practice of this invention, these coils are such that they induce eddy currents in only a small portion of the cross section of the body, this result being accomplished most conveniently by making the diameter and length of the coil or coil assembly small in relationship to the corresponding dimensions of the body undergoing test, and employing a non-closed core, viz., an air core or small open magnetic core whereby the effective area of the coil is small in relation to the cross-sectional area of the body being analyzed, as shown in the drawings. Suitable types of coil assembly are shown in Figs 5-6, 7-8 and 9-10.

In Figs. 5-6, the three coils are placed end to end coaxial with each other and adjacent and parallel to the body being tested at the side thereof.

In Figs. 7-8, the three coils are coaxial with each other and telescoped, being wound around a magnetizable metal core 21, of small diameter, that has a pointed end 21' disposed toward the body being tested, thus giving the coil an effectively small diameter, the axis of the coils being substantially perpendicular to the axis of the body.

In Figs. 9-10, the coils are again disposed coaxially and end to end, but their axes are upright while that of the body being tested is horizontal.

To return to a consideration of the apparatus of Fig. 4, the coils 10B, 10C, 10D of the coil assembly are small. The central coil 10C may be considered a primary coil, and it is flanked by the other coils (which may be considered as secondaries). The coil assembly is disposed with the coil axes parallel to the body 11 undergoing test and adjacent thereto, the three coils being connected in an oscillator tube circuit 22, comprising a vacuum tube 23, (provided with a grid 24, an anode or plate 25 and a cathode 26), a direct current source 27 for feeding direct current to the plate, a choke coil 28 to allow direct current to go to the plate, a grid leak and condenser 29, a feed-back potentiometer 30, a meter 31, and two condensers 32, 33.

To consider the oscillator tube circuit in greater detail, the two secondary coils 10B, 10D are connected in series aiding through the ends of the feed-back potentiometer to a common return point 34. A slider 35 of the potentiometer is connected to the grid of the vacuum tube through the grid leak and condenser 29. The cathode of the vacuum tube is connected through the common point 34 and the meter to one end of the primary coil 10C. The other end of the coil 10C is connected to a junction 36, which is also connected to the common point 34 through the condenser 32. The plate of the vacuum tube is connected through the choke coil to the positive terminal of the direct current source, the negative terminal of which is connected to the cathode 26. The plate is also connected through the condenser 33 and lead 37 to the junction 36.

In operation of the oscillator circuit just described in the investigation of metallic bodies, oscillations are generated (in the circuit containing the condenser 33, the primary coil 10C and the meter 31) with an amplitude just high enough to maintain these oscillations. The amplitude of oscillation is dependent upon the electrical characteristics of the space in which the eddy currents are generated in the body 11, and upon the setting of the potentiometer. Consequently, at the beginning of the test the feed-back potentiometer is adjusted to give a minimum amplitude of oscillation, and then the coil assembly is passed relative to the surface of the body 11 (as by rotating the body while moving it endwise as indicated by the arrow). As long as the electrical characteristics of successive portions of the body energized are uniform, the amplitude, as shown by the meter 31, will remain constant. However, if a flaw or the like is encountered, there will be a change in electrical characteristics of the space in which the eddy currents are generated, with consequent change in the eddy currents and in the primary current in coil 10C. The change in the primary current will bring about a pronounced meter deflection if the apparatus is adjusted (as described above) for minimum feed-back, instead of being adjusted for high efficiency oscillation.

To revert to a consideration of my invention in terms of simple apparatus, reference is made to Fig. 11, which employs a bridge arrangement to increase sensitivity of detection. In this apparatus, a pair of identical primary coils 38, 39 that are small in relation to the size of the metallic body 11 (say a rod) being tested, are disposed parallel to each other and parallel and adjacent to the body 11. However, the two coils are spaced from each other so as to energize separate sections around the circumference of the body. The coils are connected in a bridge circuit 40, a pair of resistances 41, 42 (preferably adjustable for balancing purposes) being connected in series with the respective coils, with the coil 38 and the resistance 41 connected in parallel with the coil 39 and the resistance 42. The current indicating means 15 is connected across one pair of conjugate points of the bridge, and the alternating-current source 13 is connected across the other pair of conjugate points.

In the operation of the system just described the two sides of the bridge, if originally balanced, will remain so as long as the electrical characteristics of the metal energized by the respective coils remains the same. However, if a flaw or other structural defect is encountered adjacent one of the coils, change in the eddy currents in the space energized by that coil will bring about a change in the primary current in that coil and the bridge will become unbalanced so that a change of current is observable at the current indicating means 15. This will be recognized as a form of "null method."

As with the forms of apparatus described hereinbefore, thorough testing with the apparatus of Fig. 11 involves establishing relative movement of the coils with respect to the body being tested, so that substantially all portions of the body are juxtaposed with the coils at some time.

Another mode of increasing sensitivity of detection in the practice of my invention involves the use of a pair of bucked primary coils. This, in effect, is another form of "null method."

A modification of the apparatus to employ bucked primary coils in such a "null method" is illustrated in Fig. 12. As shown in this figure, the metal object 11, say a bar of brass or iron, is tested by means of primary and secondary coil systems using an external or constant amplitude oscillator system to energize the primary coils. Thus, a pair of primary coils 10F, 10G are connected in series opposition to a constant amplitude vacuum tube oscillator system 43 of conventional design and are thus energized by alternating current. Each of the primary coils is flanked, respectively, by pairs of pickup coils 10H, 10J and 10K, 10M. The coils of each pair are connected in series aiding, but the two pairs of coils are connected in series opposition, all four coils being connected to a suitable indicator system 44.

The particular arrangement of the primary and secondary coils with respect to the body being tested is such that the two coil groups (of a primary coil with two secondary coils) are disposed adjacent different portions of the body undergoing test. The two primary coils induce eddy currents in zones in the metal adjacent the respective coils, the coils being so proportioned that complete circumferential energization of the body is avoided. Suitable dispositions of the coils with respect to the body are shown in Figs. 13-14, 15-16 and 17-18. Thus, in Figs. 13-14 the primary coil 10F is flanked on either end by coaxially disposed secondary coils 10H, 10J, this group of coils being placed parallel with the body (which is considerably larger in cross section than the coils). Spaced a fixed distance from this first group of coils and parallel there with is the second group of coils comprising the primary 10G flanked at either end by the coaxial secondaries 10K and 10M. With the coils so arranged, the body is "spiraled" past them, the distance between the body and the coils being maintained substantially constant. If the system is originally in balance and the two primary coils are adjacent metal zones having identical electrical characteristics the indicator 44 will read zero, since the effect of the eddy currents in the two zones will counteract each other. However, as relative movement occurs between the coils and the body, a deflection of the indicator will be noted whenever the two primary coils encounter zones having different electrical characteristics.

An alternative arrangement of the two coil groups of Figs. 13–14 is shown in Figs. 15–16 in which the two coil groups are staggered along the body being investigated. A further satisfactory arrangement of the coil groups is shown in Figs. 17–18 wherein both coil groups are disposed coaxially with each other but uncoaxial and parallel with the body.

The efficiency of the apparatus illustrated in Fig. 12 may be increased by modifying the oscillator system 43, as shown in Fig. 19. In the modification illustrated by Fig. 19, the portions of the apparatus common to the apparatus of Fig. 12 are marked with the same reference numbers. However, the coils 10F and 10G of the primary circuit are connected in bridge relationship to the oscillator through a potentiometer 45 and a pair of variable condensers 46, 47 arranged in the primary circuit as shown in the figure. Thus, each of the primary coils is connected at one end to opposite ends of the potentiometer and is connected by its other end to the oscillator system and also to the slider of the potentiometer through the respective variable condensers. The arrangement shown in Fig. 19 facilitates compensation of the secondary output E. M. F. and permits simple adjustment of the apparatus to a zero indication on the indicator 44. Adjustment to zero indication is made by adjusting either one of the two tuning condensers simultaneously with the potentiometer.

In place of the variable condensers in the apparatus of Fig. 19, it may be desirable to employ fixed condensers and to supplement the two coil assemblies with adjustable cores of magnetizable material, say cores of compressed iron powder provided with means for moving the cores with relation to the coils.

All of the foregoing coil arrangements have been shown as disposed on the outside of the body to be tested. Such arrangement is, of course, necessary when the body is solid. However, when tubes are subjected to test, it may be desirable to dispose the coil or coils within the tube. Such an arrangement is shown in Figs. 20–21 wherein the coil groups of Figs. 13–14 are disposed within the tube 11 adjacent the walls of the tube.

At this point, it may be well to consider the suitability of various types of coil arrangements for the detection of certain types of defects. Generally speaking, the axes of all the coils employed should be disposed in the same general direction as the major axis of the particular defect sought. In other words, defects running longitudinally in a tube or bar are best detected by a coil or coils disposed with their axes in substantially the same direction. On the other hand, defects such as cracks running transverse to the axis of the body being investigated are best detected by coils having their axes transverse to the axis of the body.

In some instances, sensitivity of the apparatus may be increased by employing a magnetic core in the coils. Pointed magnetic cores, where applicable, as in Figs. 7–8, tend to increase the flux and concentrate it at a point and are, therefore, desirable, especially when it is impracticable to reduce the coil diameter sufficiently.

In the testing of elongated bodies of uniform cross section, such as rods and tubes, it is convenient to employ a mechanical device which will assure that the body is "spiraled" past the coils of the apparatus. Figs. 22, 23 and 24 illustrate a roller arrangement that will impart the desired spiral motion to a rod or tube, i. e., advance the tube longitudinally past the coils while rotating it. As shown in the figures, a spiral motion is imparted to a cylindrical body 11 undergoing test by a pair of suitably supported crossed rollers 50, 51 that are slightly grooved in order to have a sufficient coefficient of friction. One of the rollers, for example the roller 50, may be rotated by suitable means, not shown, such as a motor or reduction gear unit, the other roller 51 being pressed against the body by means of a spring or weight combination (not shown). In this way, one of the rollers is driven while the other acts as an idler.

It should be observed that in all of the coil arrangements described hereinbefore the dominant consideration is that only a portion of the cross section of the body undergoing test be excited. Complete circumferential energization must be avoided, and, generally speaking, the smaller the energized zone or area as compared with the total circumference and length of the body, the greater will be the sensitivity in flaw detection.

I claim:

1. In a method of electrical analysis of an elongated metallic body having a longitudinal axis, the improvement which comprises, inducing eddy currents in only a small portion at a time of the cross-sectional area of said body by disposing said body in inductive relationship with a coil of the non-closed core type of which the effective area is small in relation to the cross-sectional area of said body to be analyzed, positioning said coil with its axis parallel to the axis of said body and other than coaxial with said body, spacing said coil from said body by a short air gap, energizing said coil with alternating current, moving said body with respect to said coil so that contiguous small portions of cross section of said body are successively brought into inductive relationship with said coil while maintaining substantially uniform spacing between said coil and said body, and indicating variations in the alternating current in said coil caused by a difference in eddy currents in said contiguous small portions of cross-section.

2. In a method of electrically analyzing an elongated magnetizable metallic body having a longitudinal axis, the improvement which comprises subjecting at least the portion of said body to be analyzed to a strong unidirectional magnetic field, removing said field, immediately inducing eddy currents in only a small portion at a time of the cross-sectional area of said body by disposing said body in inductive relationship with a coil of which the effective area is small in relation to the cross-sectional area of said body to be analyzed, positioning said coil with its axis parallel to the axis of said body and other than coaxial with said body, spacing said coil from said body by a short air gap, energizing said coil with high-frequency alternating current, moving said body with respect to said coil so that contiguous small portions of the cross-section of said body are successively brought into inductive relationship with said coil while maintaining substantially uniform spacing between said coil and said body, and indicating variations in the alternating current in said coil caused by a difference in eddy currents in said contiguous small portions of cross section.

3. In apparatus for analyzing an elongated metallic body having a longitudinal axis, the combination which comprises, a coil of the non-closed core type disposable in inductive relationship with said body at a small uniform distance therefrom, the effective area of said coil being small in relation to the cross-sectional area of said body to be analyzed, said coil being positioned so that its axis is parallel to the axis of said body and other than coaxial therewith, means for energizing said coil with alternating current to create eddy currents in only a small portion of the cross-sectional area of said body, means for moving said body with respect to said coil so that contiguous small portions of cross-section of said body are successively brought into inductive relationship with said coil, and means for indicating variations in the alternating current in said coil caused by changes in said eddy currents.

THEODOR ZUSCHLAG.